United States Patent
Hakura et al.

(10) Patent No.: US 8,704,835 B1
(45) Date of Patent: Apr. 22, 2014

(54) DISTRIBUTED CLIP, CULL, VIEWPORT TRANSFORM AND PERSPECTIVE CORRECTION

(75) Inventors: Ziyad S. Hakura, Gilroy, CA (US); Emmett M. Kilgariff, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 830 days.

(21) Appl. No.: 12/576,200

(22) Filed: Oct. 8, 2009

(51) Int. Cl.
*G06F 15/16* (2006.01)
*G06T 1/20* (2006.01)
*G09G 5/39* (2006.01)
*G09G 5/36* (2006.01)
*G06F 15/80* (2006.01)

(52) U.S. Cl.
USPC ........... 345/502; 345/503; 345/505; 345/506; 345/532; 345/557

(58) Field of Classification Search
USPC ................................. 345/502–506, 532, 557
See application file for complete search history.

(56) References Cited

U.S. PATENT DOCUMENTS

| | | | |
|---|---|---|---|
| 6,343,309 B1 * | 1/2002 | Clarke et al. | 718/106 |
| 7,218,331 B2 * | 5/2007 | Huang et al. | 345/622 |
| 7,454,599 B2 * | 11/2008 | Jiao et al. | 712/216 |
| 2002/0030693 A1 * | 3/2002 | Baldwin | 345/620 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Kee M Tung
*Assistant Examiner* — Robert Craddock
(74) *Attorney, Agent, or Firm* — Patterson + Sheridan, L.L.P.

(57) ABSTRACT

A parallel processing subsystem includes a plurality of general processing clusters (GPCs). Each GPC includes one or more clipping, culling, viewport transformation, and perspective correction engines (VPC). Since VPCs are distributed per GPC, each VPC can process graphics primitives in parallel with the other VPCs processing graphics primitives.

19 Claims, 10 Drawing Sheets

DISTRIBUTED CLIP, CULL, VIEWPORT TRANSFORM AND PERSPECTIVE CORRECTION

BACKGROUND OF THE INVENTION

1. Field of the Invention

The present invention generally relates to computer hardware and more specifically to distributed clip, cull, viewport transform and perspective correction.

2. Description of the Related Art

The processing power of a modern central processing unit (CPU) may be supplemented using a co-processor, such as a graphics processing unit (GPU). Oftentimes, the GPU processes graphics data in order to generate pixels that are displayed on a screen.

Conventional GPUs process graphics data using a sequence of components that each implements a different processing stage. The sequence of components is known as a "graphics processing pipeline." A portion of a prior art graphics processing pipeline 10 is illustrated in FIG. 1. As shown, graphics processing pipeline 10 includes a host 12, a front end 14, a data assembler 16, texture processing clusters (TPCs) 18-1 through 18-n, a data bus 20, a viewport culling engine (VPC) 22, a data bus 24, and a setup 26.

Data assembler 16 receives commands and indices from front end 14. The indices point to graphics primitives stored in memory, while the commands specify graphics processing operations to be performed with those primitives. Data assembler 16 fetches the graphics primitives from memory and generates different "batches," where each batch includes a subset of the graphics primitives. Data assembler 16 then distributes one or more batches to each TPC 18.

TPCs 18-1 through 18-n each colorizes pixels associated with the graphics primitives in a batch received from data assembler 16. TPCs 18-1 through 18-n then transmit the graphics primitives, along with the colorized pixels, to VPC 22 through data bus 20. VPC 22 accumulates all of the graphics primitives and all of the colorized pixels from TPCs 18-1 through 18-n and then performs clipping, culling, viewport transform, and perspective correction for all of the received graphics primitives. VPC 22 sends processed primitives to setup 26 via data bus 24. Setup 26 prepares the primitives to be rasterized.

One drawback of the architecture described above is that VPC 22 processes graphics primitives in the order with which data assembler 16 fetches those primitives. Consequently, when a given TPC 18 has not finished processing a particular graphics primitive, VPC 22 cannot process any graphics primitives that were fetched subsequently to the graphics primitive still being processed by the TPC 18, thereby causing a processing bottleneck. Another drawback of this architecture is that data bus 20 must transport all of the graphics primitives and colorized pixels to VPC 22. This architecture is not scalable because increasing the number of TPCs 18 could require data bus 20 to be increased to an impractical size. A third drawback is that data bus 24 must transport all of the processed graphics primitives from VPC 22 to setup 26. As with data bus 20, increasing the number of TPCs 18 could require data bus 24 to be increased to an impractical size.

Accordingly, there remains a need in the art for a more efficient and scalable way to perform clipping, culling, viewport transform, and perspective correction.

SUMMARY OF THE INVENTION

One embodiment of the invention includes a general processing cluster (GPC) for processing graphics data, including two or more parallel processing units, where each parallel processing unit includes a viewport culling engine (VPC) configured to perform clipping, culling, viewport transformation, or perspective correction operations with graphics primitives.

Another embodiment of the invention includes a system for processing graphics data, including two or more GPCs, each including one or more viewport culling engines (VPCs) configured to perform clipping, culling, viewport transformation, or perspective correction operations with graphics primitives.

Advantageously, clipping, culling, viewport transformation, and perspective correction operations for a plurality of different sets of graphics primitives can be performed in parallel and independently of one another.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
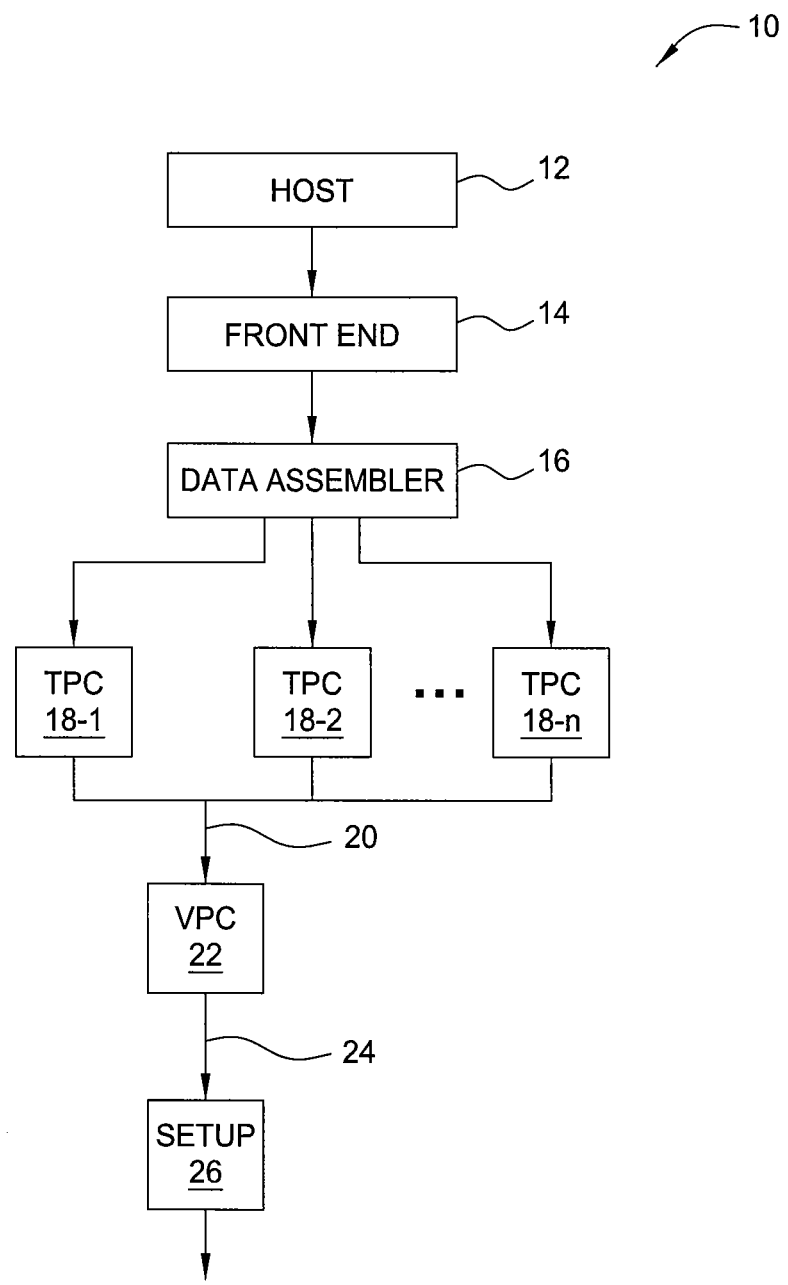
FIG. 1 is a prior art graphics processing pipeline.
Figure 2A:
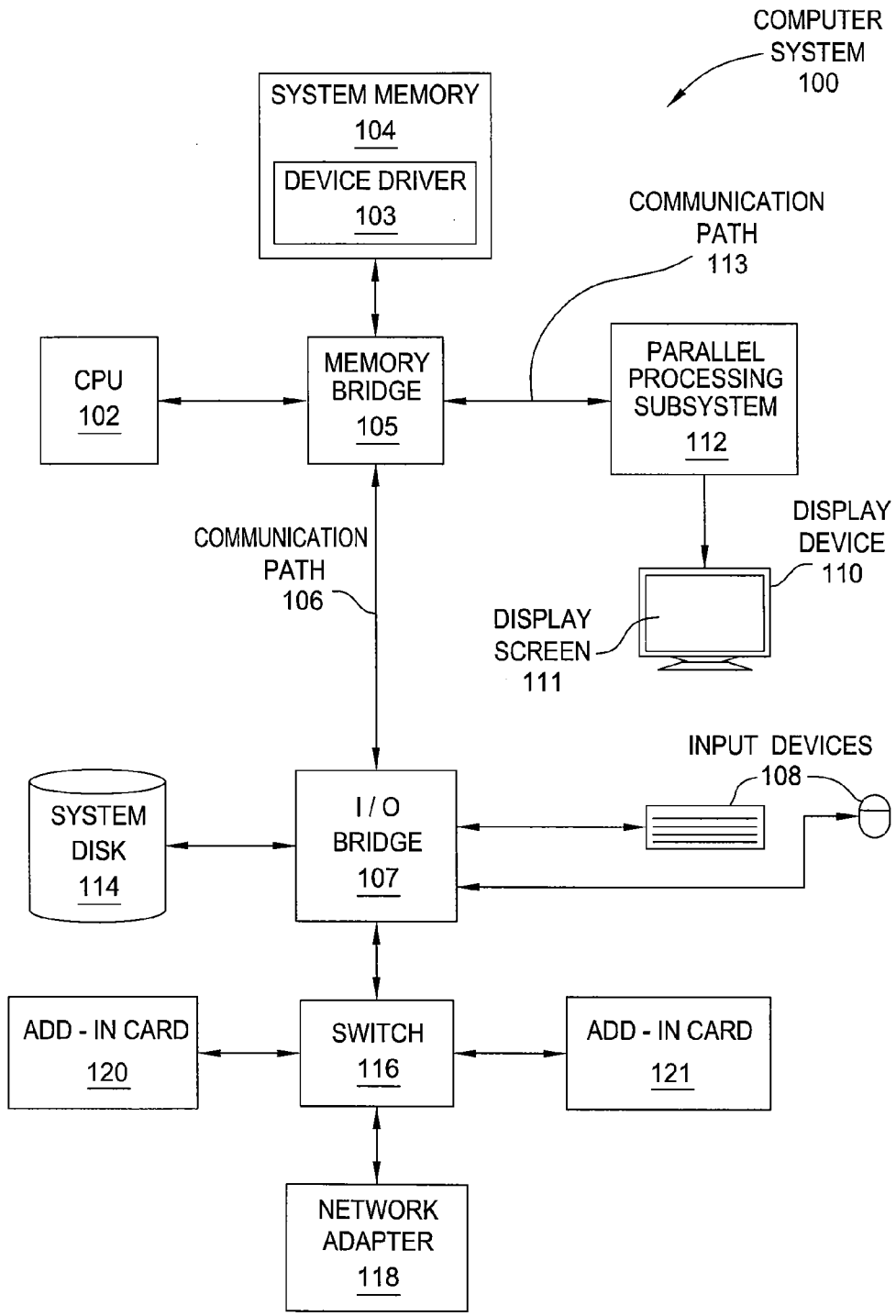
FIG. 2A is a block diagram illustrating a computer system configured to implement one or more aspects of the invention.

FIG. 2A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
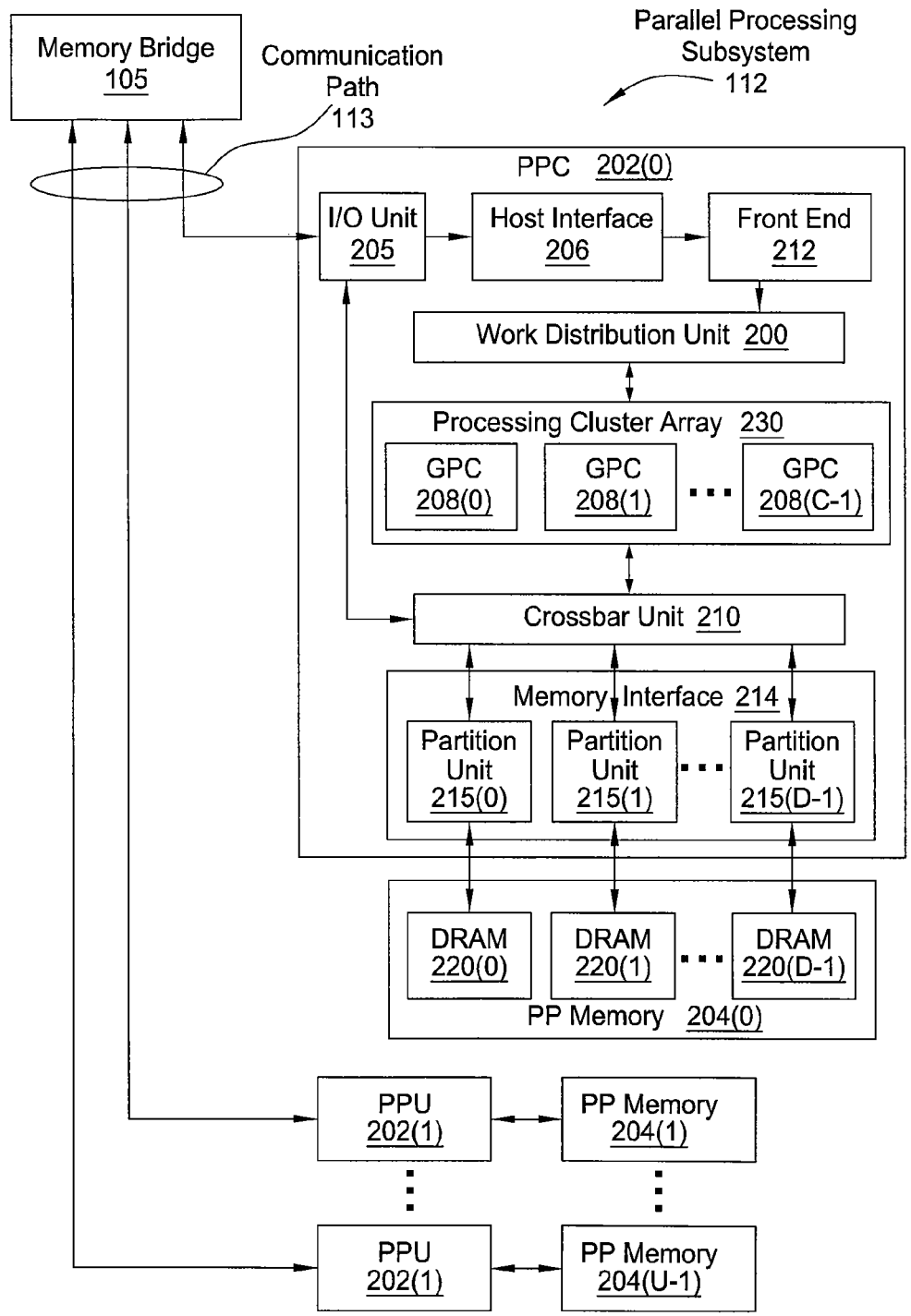
FIG. 2B is a block diagram of a parallel processing subsystem for the computer system of FIG. 1, according to one embodiment of the invention.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1.

Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
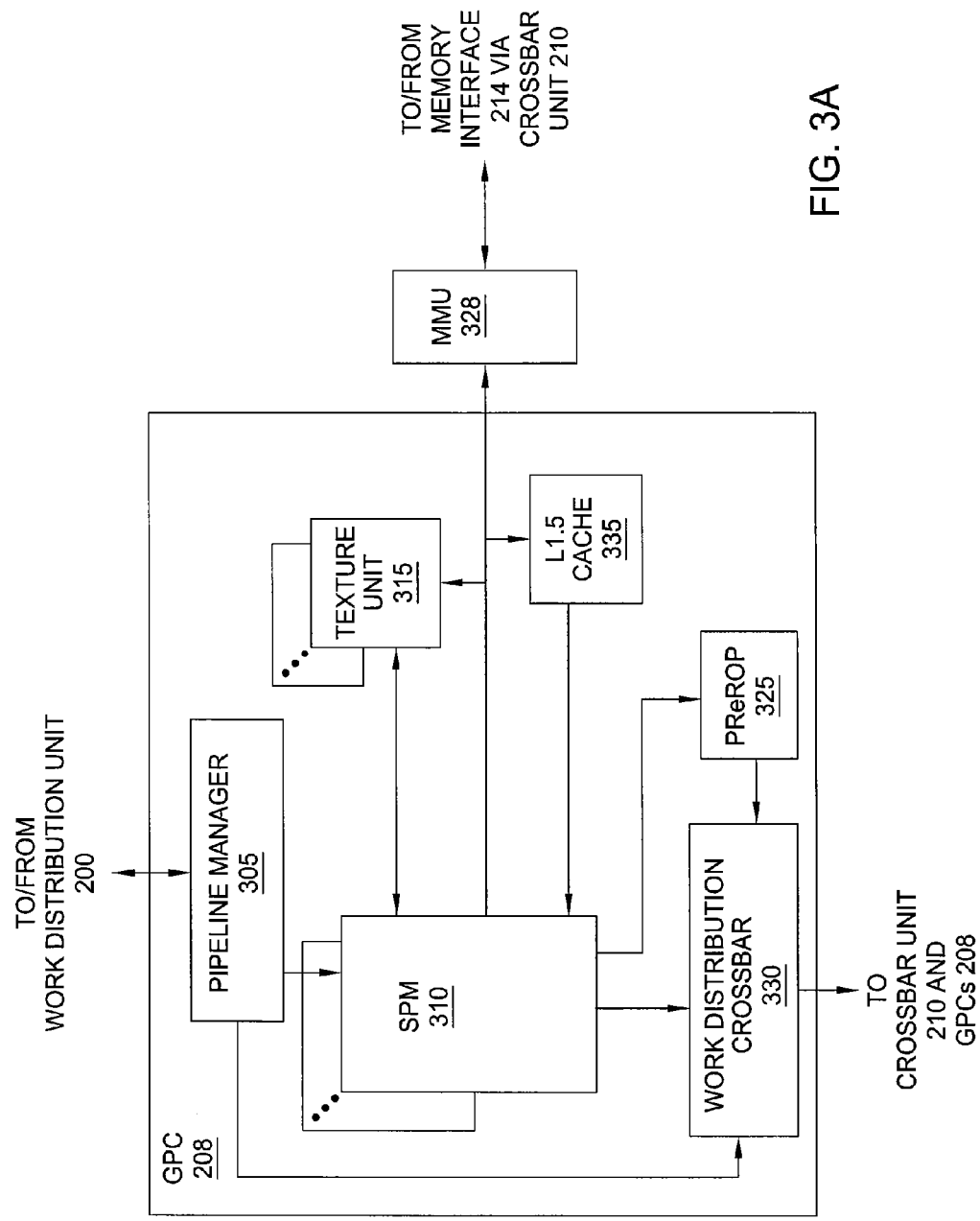
FIG. 3A is a block diagram of a GPC within one of the PPUs of FIG. 2, according to one embodiment of the invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
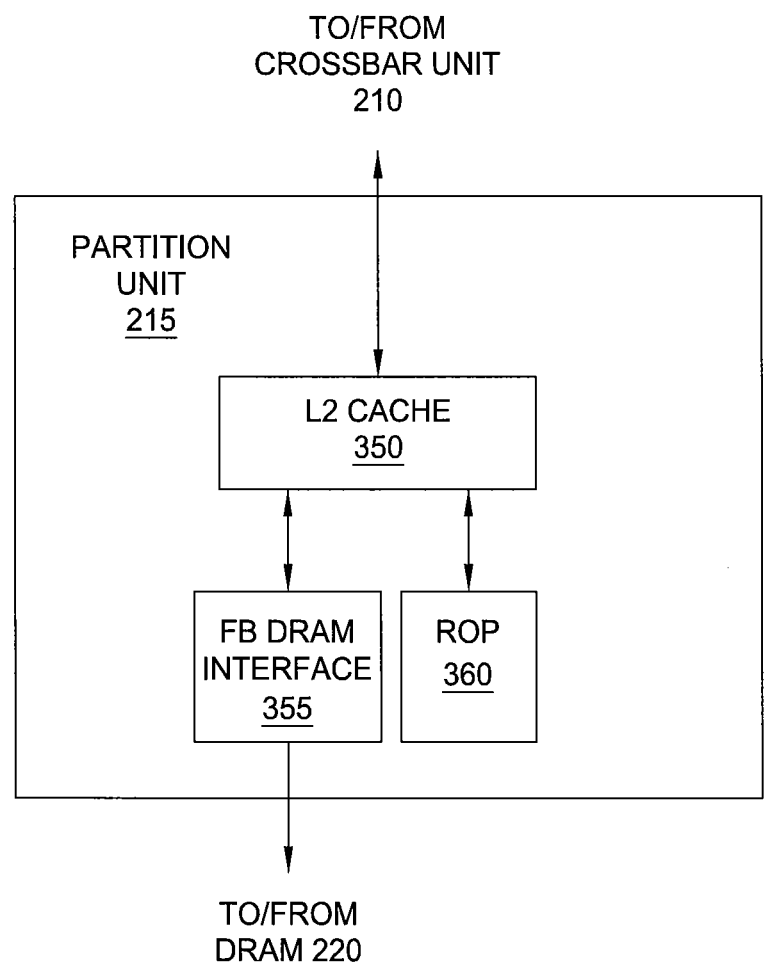
FIG. 3B is a block diagram of a partition unit within one of the PPUs of FIG. 2, according to one embodiment of the invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
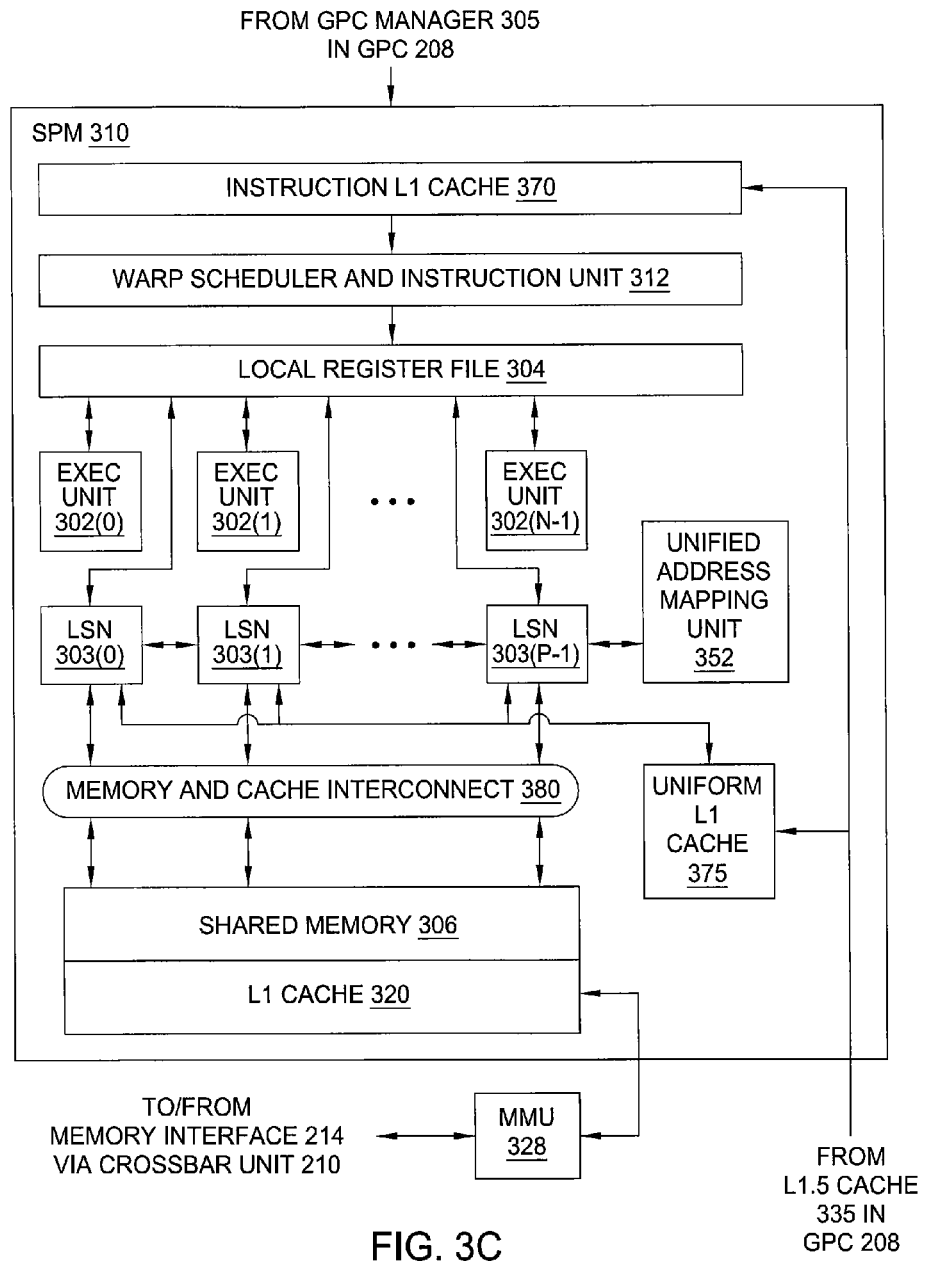
FIG. 3C is a block diagram of a portion of the SPM of FIG. 3A, according to one embodiment of the invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CIA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
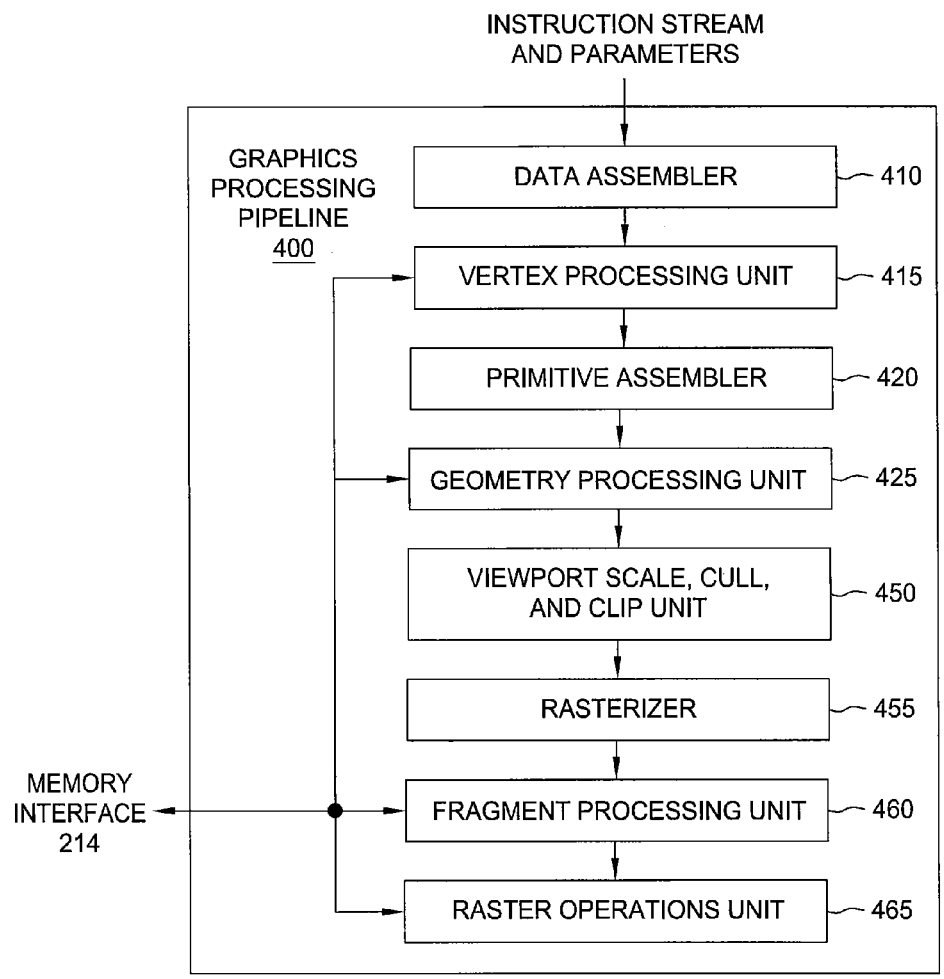
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Distributed Culling, Clipping, Viewport Transform, and Perspective Correction

Figure 5:
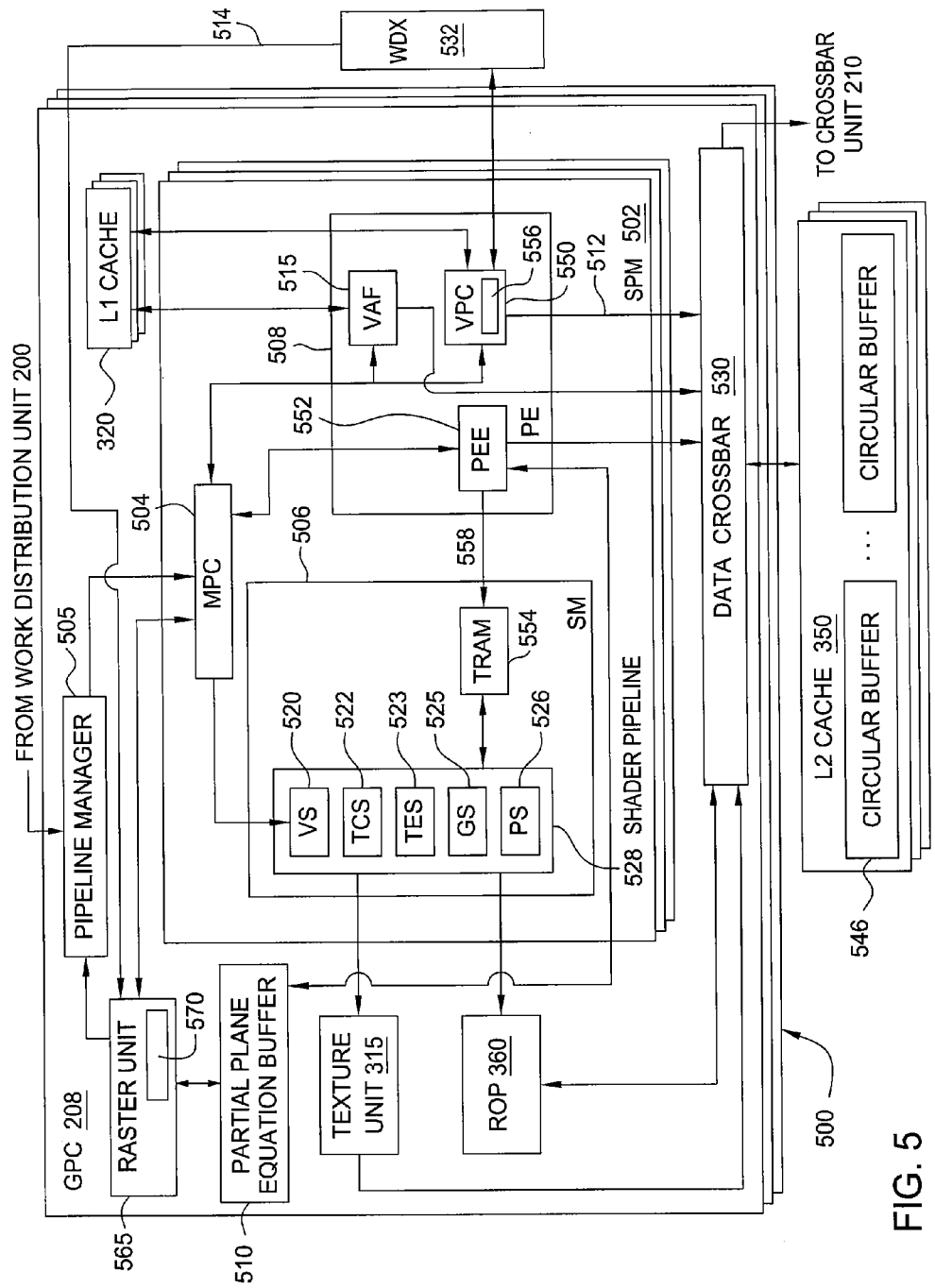
FIG. 5 is a block diagram of a distributed graphics processing pipeline, according to one embodiment of the invention.

FIG. 5 is a block diagram of a distributed graphics processing pipeline (DGPP) 500, according to one embodiment of the present invention. DGPP 500 includes one or more general processing clusters (GPCs) 208, where each GPC 208 includes a plurality of ShaderMultiprocessor-PrimitiveEngine-MpipeControllers (SPMs) 502. Each SPM includes an Mpipe controller (MPC) 504, a shader multiprocessor (SM) 506, and a primitive engine (PE) 508.

Each SPM 502 on a GPC 208 is managed by a pipeline manager 305 that receives data from work distribution unit (WDU) 200. The received data may include graphics vertices separated into groups, hereinafter referred to as "batches." The pipeline manager 305 is configured to transmit a batch to each SPM 502 for processing. The batch assigned to SPM 502 is received by MPC 504, which manages the operation of both the SM 506 and the PE 508. The MPC 504 transmits the batch to the PE 508 for processing and halts operation of components within the SM 506 until some or all of the processing performed by the PE 508 is complete.

PE 508 includes a vertex attribute fetch engine (VAF) 515, a viewpoint culling engine (VPC) 550, and a primitive evaluation engine (PEE) 552. VAF 515 receives the batch from MPC 504 and fetches vertex attributes associated with the vertices in the batch. Vertex attributes may include color, position, or other attributes. VAF 515 temporarily stores the vertex attributes in an L1 cache 320 associated with SPM 502. VAF 515 then notifies MPC 504 that the vertex attributes are stored in L1 cache 320. In one embodiment, L1 cache 320 is replaced with a buffer or another type of memory unit.

MPC 504 then causes a shader pipeline 528 within SM 506 to execute enabled shaders. Shader pipeline 528 includes a plurality of shader units that may be enabled to process vertex data. Shader pipeline 528 includes a vertex shader (VS) 520, a tessellation control shader (TCS) 522, a tessellation evaluation shader (TES) 524, a geometry shader (GS) 525 and a pixel shader (PS) 526 that sequentially perform processing operations, as further described below. Once the sequential processing operations performed by the shaders within shader pipeline 528 are complete, SM 506 writes processed vertex data to L1 cache 320. MPC 504 then notifies VPC 550 that vertex data is ready for processing an stored in L1 cache 320. VPC 550 then reads the vertex data from L1 cache 320.

VPC 550 performs clipping, culling, viewport transformation, and perspective correction on processed vertex data. VPC 550 performs clipping operations by converting portions of a triangle residing partially within a viewing frustrum into two or more triangles. VPC 550 performs culling operations by removing triangles that do not reside within the viewing frustrum. VPC 550 may also perform other types of culling, such as backface culling, and so forth. VPC 550 performs viewport transformation by converting four-dimensional homogeneous clip-space coordinates of graphics primitives into a two-dimensional projection of those primitives. VPC 550 performs perspective correction by modifying texture coordinates and other perspective-corrected attributes based on a scaling factor. In one embodiment, the scaling factor is 1/w, where w is the 4th coordinate of a vertex and represents the distance from an object that includes the vertex to the eye.

VPC 550 includes a circular buffer (CB) manager 556 configured to allocate space within L2 cache 350 as one or more circular buffers (CBs) 546 to store vertex attributes associated with vertex data processed by VPC 550. In one embodiment, CB manager 556 resides outside of VPC 550. Once CB manager 556 allocates the required circular buffer entries (CBEs), VPC 550 transmits processed vertex attributes along path 512 to data crossbar (x-bar) 530. Data x-bar 530 is a general data distribution resource that can be used by some or all of the components of GPC 208 for exchanging data. Since VPC 550 uses data x-bar 530 to transmit processed vertex attributes, a dedicated bus is not required solely for VPC 550, as with prior art approaches.

Data x-bar 530 is configured to distribute vertex attributes to CBs 546. CB manager 556 may allocate CBs 546 on any L2 cache on PP subsystem 112, and likewise, data x-bar 530 may transmit vertex attributes to any L2 cache on PP subsystem 112. VPC 550 then transmits pointers to the locations of the vertex attributes, referred to herein as circular buffer entry pointers, or "CBE pointers," to work distribution x-bar (WDX) 532.

VPC 550 is further configured to perform a bounding-box calculation with the graphics primitives to determine which region of the display screen each graphics primitive belongs to. This information is used to route each graphics primitive to one of a plurality of raster units, such as raster unit 565. Raster unit 565 rasterizes graphics primitives and fragments of graphics primitives that overlap a particular region of the display. Accordingly, WDX 532 transmits the graphics primitives associated with each region of the display to the raster unit that rasterizes that region of the display. Each raster unit 565 includes a setup unit 570 that receives the graphics primitives from WDX 532 and prepares the graphics primitives to be rasterized. WDX 532 also transmits the CBE pointers to the raster unit 565 along path 514. The CBE pointers to each vertex attribute are stored with the graphics primitive associated with that attribute.

Raster unit 565 receives the graphics primitives that overlap the region of the display belonging to the raster unit 565. Raster unit then associates the received graphics primitives with the pixels in that region to create a "tile." Raster unit 565 transmits the tile to the MPC 504. Raster unit 565 also generates partial plane equations based on the graphics primitives and stores these partial plane equations, and the associated CBE pointers, in a partial plane equation buffer (PPEB) 510. When one or more partial plane equations have been stored in PPEB 510, MPC 504 allows a primitive evaluation engine (PEE) 552 to access the PPEB 510.

PEE 552 retrieves the CBE pointers and partial plane equations from PPEB 510 according to instructions from MPC 504. PEE 552 then retrieves the vertex attributes corresponding to the graphics primitives in the tile from L2 cache 350 using the CBE pointers and solves for the coefficients of the plane equations using the retrieved vertex attributes. PEE 552 stores the resultant plane equation coefficients in a triangle RAM (tRAM) 554 within SM 506 along path 558. When a number of plane equation coefficients stored in tRAM 554 reaches a threshold amount, MPC 504 transmits the tile output by raster unit 565 to shader pipeline 528 included within SM 506.

VS 520 is a programmable execution unit that is configured to execute vertex shader programs on vertex data that may include lighting evaluation and transformations. For example, VS 520 may be programmed to transform the vertex data from an object-based coordinate representation (object space) to an alternatively based coordinate system such as world space or normalized device coordinates (NDC) space. VS 520 may read data that is stored in the L1 cache 320, PP memory 204, or system memory 104 when processing the vertex data. VS 520 transmits processed vertex data to TCS 522.

TCS 522 is a programmable execution unit that performs a change of basis of a control point, computation of tessellation LODs parameters, or the like, and is executed once for each surface patch described by the received vertex data. TCS 522 transmits processed vertex data to TES 524.

TES 524 is a programmable execution unit that computes a final position and attributes of each vertex based on patch primitive control points, parametric (u,v) position for each vertex, displacement maps, and the like, and is executed once for each output vertex. TES 524 transmits processed vertex data to GS 525.

GS 525 is a programmable execution unit that is configured to execute geometry shader programs on received vertex data. In some embodiments, GS 525 may also add or delete elements from the vertex data. GS 525 may read data that is stored in parallel processing memory 204 or system memory 104 when processing the geometry data. GS 525 transmits processed vertex data, e.g., graphics primitives, to PS 560. In one embodiment, once TCS 522 processes the vertext data, that data is transferred to a TES 524 and a GS 525 that reside on a different SPM 502 for further processing.

PS 526 is a programmable execution unit that is configured to execute pixel shader programs using the plane equation coefficients stored in tRAM 554 and texture data stored in texture unit 315. PS 560 may also read data that is stored in PP memory 204 or system memory 104 via L2 cache 350. PS 526 may be programmed to perform operations such as perspective correction, texture mapping, shading, blending, and the like, to generate colorized pixels that are output to Raster Operations Unit (ROP) 360.

ROP 360 is a processing unit that performs raster operations, such as stencil, z test, and the like, and outputs pixel data as processed graphics data. In some embodiments of the present invention, ROP 360 is configured to compress z or color data that is written to memory and decompress z or color data that is read from memory. Processed graphics data output by ROP 360 may be routed through data x-bar 530 to parallel processing memory 204, and/or system memory 104, for display on display device 110 or for further processing by CPU 102 or parallel processing subsystem 112. Graphics data may also be stored in in L1 cache 320 for further processing.

Figure 6A:
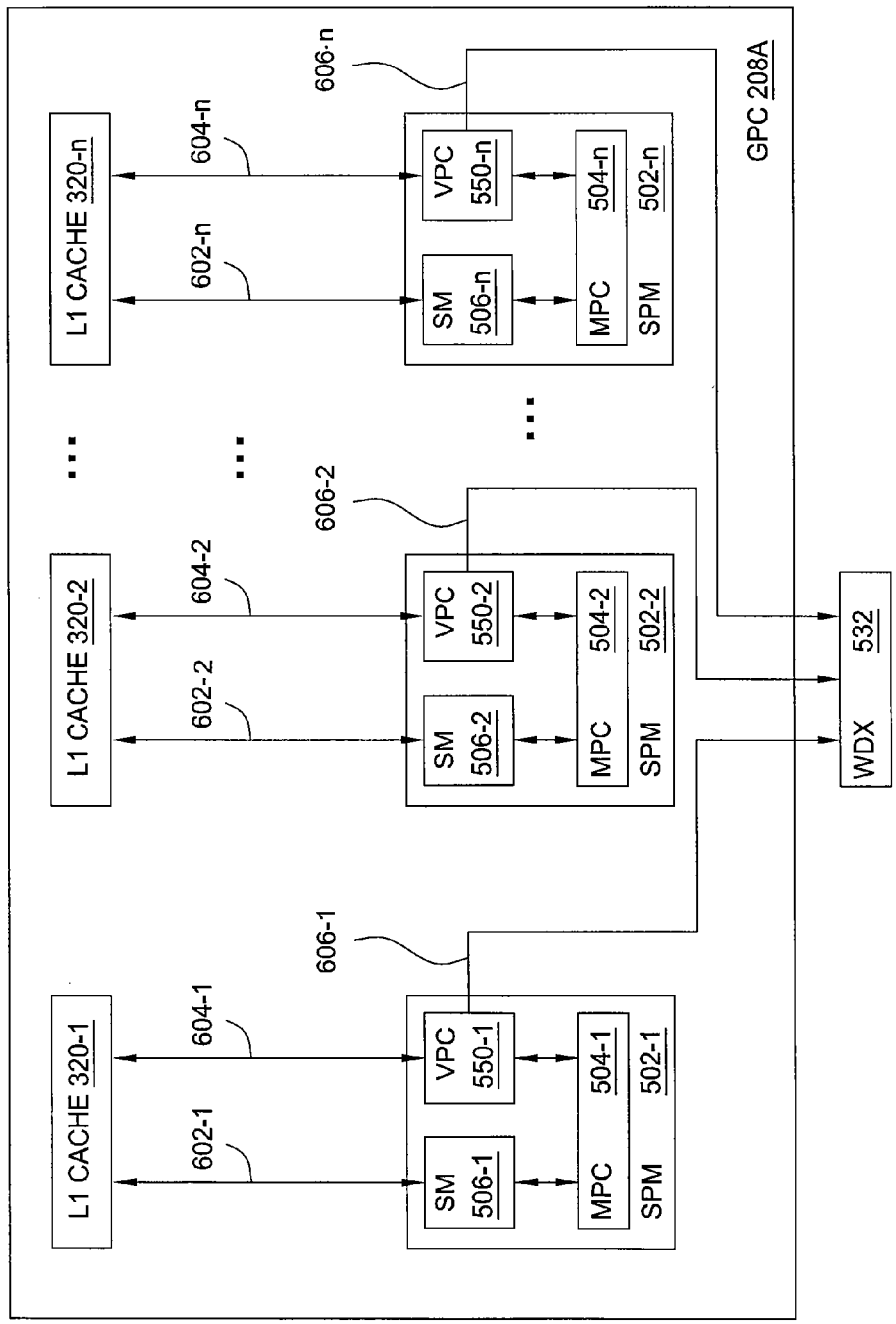
FIGS. 6A-6B are block diagrams of different GPCs, according to various embodiments of the invention.

FIG. 6A is a block diagram of a GPC 208A, according to one embodiment of the invention. GPC 208A represents one exemplary architecture of a GPC 208, although other architectures are possible, as described in FIG. 6B.

FIG. 6A illustrates multiple instances of specific components (e.g., SM 506-1, SM 506-2, etc.). In the following description, these specific instances will be referred to by generic labels (e.g., SM 506). As shown, GPC 208A includes L1 caches 320 and SPMs 502. Each SPM 502 includes an SM 506, a VPC 550, and an MPC 504. Each SM 506 is coupled to an L1 cache 320 via a data bus 602. Each VPC 550 is coupled to an L1 caches 320 via a data buses 604. SMs 506 and VPCs 550 are each coupled to a local MPC 504. MPCs 504 transmit control signals to SMs 506 and VPCs 550 to coordinate graphics processing operations.

SPMs 502 perform graphics processing operations on vertex data associated with a received batch using SMs 506 in the fashion described in FIG. 5. Once SMs 506 process vertex data associated with the batch, SMs 506 store the processed vertex data in L1 caches 320 via data buses 602. SMs 506 notify MPCs 504 when processing is complete, and MPCs 504 then cause VPCs 550 to retrieve vertex data from L1 caches 320.

VPCs 550 are configured to retrieve vertex data, including graphics primitives and vertex attributes, from L1 caches 320 via data buses 604. Each VPC 550 performs clipping, culling, viewport transformation, and perspective correction using the retrieved vertex data in parallel with the other VPCs 550 performing these operations. VPCs 550 then transmit processed graphics primitives to WDX 532 via data buses 606.

Each VPC 550 can retrieve a different set of graphics primitives from a different L1 cache 320 via data buses 604, and, thus, each VPC 550 can process a different set of graphics primitives independently of the other VPCs 550 processing graphics primitives. Additionally, each data bus 604 needs only to transport graphics primitives to one VPC 550. Thus, the size of each such data bus 604 can be relatively small compared to prior art approaches. Lastly, each VPC 550 transmits graphics primitives and CBE pointers to WDX 332 via a separate data bus 606, thereby avoiding a need for a large data bus that connects all of the VPCs 550. A consequence of the parallel architecture described herein is that the number of SPMs 502 within a GPC 208A can be increased without requiring a data bus of impractical size.

Figure 6B:
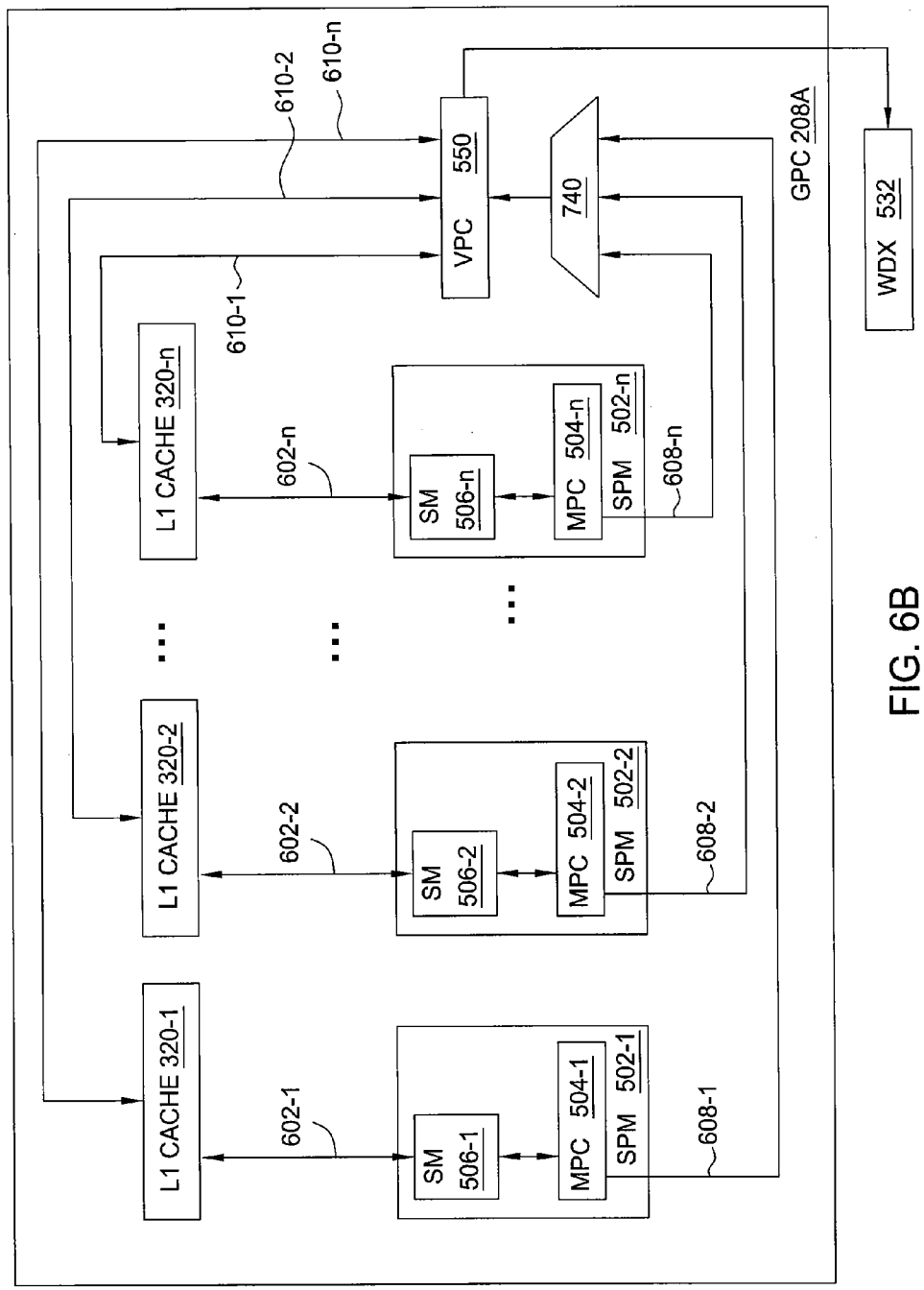

FIG. 6B is a block diagram of a GPC 208B, according to one embodiment of the invention. GPC 208B represents another exemplary architecture of GPC 208. Like FIG. 6A, FIG. 6B illustrates multiple instances of specific components (e.g., SM 506-1, SM 506-2, etc.). In the following description, these specific instances will be referred to by generic labels (e.g., SM 506).

As shown, GPC 208B includes L1 caches 320, SPMs 502, VPC 550, and multiplexer (mux) 704. Each SPM 502 includes an SM 506 and an MPC 504. Each SM 506 is coupled to an L1 cache 320 via a data bus 602 and to a local MPC 504. Each MPC 504 is coupled to mux 704 via a data bus 608. Mux 704 is coupled to VPC 550 which, in turn, is coupled to each of L1 caches 320 via data buses 610. VPC 550 is coupled to WDX 532.

SPMs 502 perform graphics processing operations on vertex data associated with a received batch using SMs 506 in the fashion described in FIGS. 5 and 6B. Once SMs 506 process vertex data associated with the batch, SMs 506 store the processed vertex data in L1 caches 320 via data buses 602. SMs 506 notify MPCs 504 when processing is complete, and MPCs 504 then transmit control signals to VPC 550 via mux 704.

In response to control signals received from one or more of MPCs 504, VPC 550 is configured to retrieve vertex data, including graphics primitives and vertex attributes, from one or more of L1 caches 320 via data buses 604. VPC 550 performs clipping, culling, viewport transformation, and perspective correction using the retrieved vertex data and then transmits processed graphics primitives and vertex attributes to WDX 532.

The architecture illustrated in FIG. 6B provides an alternative solution to certain problems with prior art approaches. Specifically, in the embodiment of the invention described in FIG. 6B, each VPC 550 is distributed per GPC 208B. Thus, a given VPC 550 only performs processing operations with data processed by the GPC 208B within which that VPC 550 resides. Accordingly, a given VPC 550 can process graphics primitives independently of VPCs 550 in other GPCs 208 processing graphics primitives. Further, since each GPC 208B includes a local VPC 550, a system-wide bus that transports graphics primitives is not required. Instead, a set of local buses 610 transport the graphics primitives to a local VPC 550. In further embodiments, multiple VPCs 550 reside within GPC 208, where each VPC 550 processes graphics primitives for two or more different SPMs 502.

In sum, each StreamingMultiprocessor-PrimitiveEngine-MpipeController (SPM) within a general processing cluster (GPC) includes a viewport culling engine (VPC) configured to perform clipping, culling, viewport transformation, and perspective correction on graphics data associated with that SPM. Within a given SPM, a streaming multiprocessor (SM) transmits vertex data to an L1 cache. A local VPC reads the vertex data, including vertex attributes and graphics primitives, and performs the clipping, culling, viewport transformation, and perspective correction operations described above. The VPC then allocates one or more circular buffer entries (CBEs) within a circular buffer (CB) residing within an L2 cache and then transmits vertex attributes to the allocated circular buffer entry. The VPC also performs a bounding box calculation to determine a particular region of a display screen within which each graphics primitive resides. The VPC then sends each graphics primitive to a raster unit that rasterizes the pixels associated with the screen region within which the graphics primitive resides.

Advantageously, clipping, culling, viewport transformation, and perspective correction operations for a plurality of different sets of graphics primitives can be performed in parallel and independently of one another, thereby increasing the throughput of the parallel processing subsystem 112. Additionally, the parallel architecture described herein can be scaled up to include more GPCs and/or SPMs without requiring an impractically large bus.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored;

and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A general processing cluster (GPC) for processing graphics data, comprising:
    two or more parallel processing units, wherein each parallel processing unit is associated with a viewport culling engine (VPC) that comprises a processing stage in a graphics processing pipeline and is configured to:
        perform at least one graphics operation on a first set of graphics primitives to generate at least one graphics primitive that is associated with one or more vertex attributes, and
        transmit to a work distribution crossbar at least one pointer to a location of a vertex attribute, wherein the work distribution crossbar is connected to each VPC and configured to distribute the at least one graphics primitive to one or more components of the GPC for further processing,
    wherein each VPC includes a circular buffer manager configured to:
        allocate a circular buffer within a Level 2 cache, and
        store the one or more vertex attributes in a circular buffer entry within the circular buffer.

2. The GPC of claim 1, wherein the at least one graphics operation comprises clipping, culling, viewport transformation, or perspective correction.

3. The GPC of claim 2, wherein the VPC is further configured to:
    perform a bounding box calculation with the at least one graphics primitive to determine a first region of a display screen associated with the at least one graphics primitive.

4. The GPC of claim 3, wherein the circular buffer manager is further configured to provide to the VPC a first circular buffer entry pointer that identifies the circular buffer entry that stores the one or more vertex attributes.

5. The GPC of claim 4, wherein the VPC causes the at least one graphics primitive and the first circular buffer entry pointer to be transmitted to a raster unit included in the graphics processing pipeline, wherein the raster unit rasterizes pixels corresponding to the first region of the display screen.

6. The GPC of claim 1, wherein a first VPC resides within a first parallel processing unit of the two or more parallel processing units, a second VPC resides within a second parallel processing unit of the two or more parallel processing units, and the first VPC processes a first sequence of graphics primitives independently of the order with which the second VPC processes a second sequence of graphics primitives.

7. A system for processing graphics data, comprising:
    two or more parallel processing units, wherein each parallel processing unit is associated with a viewport culling engine (VPC) that comprises a processing stage in a graphics processing pipeline and is configured to:
        perform at least one graphics operation on a first set of graphics primitives to generate at least one graphics primitive that is associated with one or more vertex attributes, and
        transmit to a work distribution crossbar at least one pointer to a location of a vertex attribute, wherein the work distribution crossbar is connected to each VPC and configured to distribute the at least one graphics primitive to one or more components of the GPC for further processing,
    wherein each VPC includes a circular buffer manager configured to:
        allocate a circular buffer within a Level 2 cache, and
        store the one or more vertex attributes in a circular buffer entry within the circular buffer.

8. The system of claim 7, wherein the at least one graphics operation comprises clipping, culling, viewport transformation, or perspective correction.

9. The system of claim 8, further comprising a display screen, wherein the at least one VPC is configured to perform a bounding box calculation with the at least one graphics primitive to determine a first region of the display screen associated with the at least one graphics primitive.

10. The system of claim 9, wherein the circular buffer manager is further configured to provide to the at least one VPC a first circular buffer entry pointer that identifies the circular buffer entry that stores the one or more vertex attributes.

11. The system of claim 10, wherein the at least one VPC causes the at least one graphics primitive and the first circular buffer entry pointer to be transmitted to a raster unit included in the graphics processing pipeline, wherein the raster unit rasterizes pixels corresponding to the first region of the display screen.

12. The system of claim 11, wherein a first VPC residing within a first GPC of the two or more GPCs processes a first sequence of graphics primitives independently of the order with which a second VPC residing within a second GPC of the two or more GPCs processes a second sequence of graphics primitives.

13. A system for processing graphics data, comprising:
    a central processing unit (CPU);
    a memory unit coupled to the CPU;
    a display screen coupled to the CPU; and
    two or more parallel processing units, wherein each parallel processing unit is associated with a viewport culling engine (VPC) that comprises a processing stage in a graphics processing pipeline and is configured to:
        perform at least one graphics operation on a first set of graphics primitives to generate at least one graphics primitive that is associated with one or more vertex attributes, and
        transmit to a work distribution crossbar at least one pointer to a location of a vertex attribute, wherein the work distribution crossbar is connected to each VPC and configured to distribute the at least one graphics primitive to one or more components of the GPC for further processing,
    wherein each VPC includes a circular buffer manager configured to:
        allocate a circular buffer within a Level 2 cache, and
        store the one or more vertex attributes in a circular buffer entry within the circular buffer.

14. The system of claim 13, wherein the at least one graphics operation comprises clipping, culling, viewport transformation, or perspective correction.

15. The system of claim 14, wherein the at least one VPC is configured to perform a bounding box calculation with the at least one graphics primitive to determine a first region of the display screen associated with the at least one graphics primitive.

16. The system of claim 15, wherein the circular buffer manager is further configured to provide to the at least one VPC a first circular buffer entry pointer that identifies the circular buffer entry that stores the one or more vertex attributes.

17. The system of claim 16, wherein the at least one VPC causes the at least one graphics primitive and the first circular buffer entry pointer to be transmitted to a raster unit included in the graphics processing pipeline, wherein the raster unit rasterizes pixels corresponding to the first region of the display screen.

18. The system of claim 17, wherein a first VPC residing within a first GPC of the two or more GPCs processes a first sequence of graphics primitives independently of the order with which a second VPC residing within a second GPC of the two or more GPCs processes a second sequence of graphics primitives.

19. The system of claim 13, wherein the at least one VPC resides within a parallel processing unit of one of the two or more GPCs.

* * * * *